United States Patent
Nogi et al.

(10) Patent No.: US 11,144,242 B2
(45) Date of Patent: Oct. 12, 2021

(54) DISTRIBUTED STORAGE SYSTEM

(71) Applicant: HITACHI, Ltd., Tokyo (JP)

(72) Inventors: Erina Nogi, Tokyo (JP); Jun Miyashita, Tokyo (JP); Akihiro Shikano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 161 days.

(21) Appl. No.: 16/577,569

(22) Filed: Sep. 20, 2019

(65) Prior Publication Data

US 2020/0264806 A1    Aug. 20, 2020

(30) Foreign Application Priority Data

Feb. 14, 2019    (JP) .............................. JP2019-024936

(51) Int. Cl.
*G06F 3/06*      (2006.01)
*G06F 13/16*     (2006.01)

(52) U.S. Cl.
CPC .......... *G06F 3/0659* (2013.01); *G06F 3/0604* (2013.01); *G06F 3/067* (2013.01); *G06F 13/1668* (2013.01)

(58) Field of Classification Search
None
See application file for complete search history.

(56) References Cited

U.S. PATENT DOCUMENTS

2010/0011129 A1    1/2010  Bita
2021/0081120 A1*   3/2021  Iwai ..................... G06F 3/0659

FOREIGN PATENT DOCUMENTS

JP    2010-020694 A    1/2010

* cited by examiner

*Primary Examiner* — Charles J Choi
(74) *Attorney, Agent, or Firm* — Foley & Lardner LLP

(57) ABSTRACT

Each node constituting a distributed storage system includes one or more controllers. Each controller includes an actual queue group for each drive physically coupled to the controller, and a virtual queue group for each of a plurality of drives. A Drive-IO issued by any controller and received is accumulated in the actual queue group corresponding to an issue destination drive of the Drive-IO after accumulated in the virtual queue group corresponding to the issue destination drive.

15 Claims, 8 Drawing Sheets

FIG. 3

CONFIGURATION TABLE
221

| DRIVE # /301 | DRIVE ADDRESS /302 | VOL ADDRESS /303 | CTL# /304 |
|---|---|---|---|
| 00 | aaaa | bbbb | 6A0, 6C0 |
|  | ... | ... |  |
| 01 | ... | ... | ... |
| ... | ... | ... | ... |

FIG. 4

OWNERSHIP TABLE
222

| VOL# /401 | CTL# /402 |
|---|---|
| 00 | 6A0 |
| 01 | 6A1 |
| ... | ... |

FIG. 5

CONTRACT FLAG TABLE
223

| COUPLED DRIVE # /501 | CONTRACT FLAG /502 |
|---|---|
| 00 | ON |
| 11 | OFF |
| ... | ... |

FIG. 6

VIRTUAL-QUEUE MANAGING TABLE
224

| DRIVE # /601 | VIRTUAL UPPER LIMIT VALUE /602 | NUMBER OF IO /603 |
|---|---|---|
| 00 | ... | Core1:3 |
|  |  | Core2:4 |
|  |  | ... |
| 01 | ... | ... |
| ... | ... | ... |

FIG. 7

ACTUAL-QUEUE MANAGING TABLE
225

| COUPLED DRIVE # /701 | ACTUAL UPPER LIMIT VALUE /702 | NUMBER OF IO /703 |
|---|---|---|
| 00 | ... | Core1:1 |
|  |  | Core2:3 |
|  |  | ... |
| 11 | ... | ... |
| ... | ... | ... |

DISTRIBUTED STORAGE SYSTEM

CROSS-REFERENCE TO PRIOR APPLICATION

This application relates to and claims the benefit of priority from Japanese Patent Application number 2019-24936, filed on Feb. 14, 2019 the entire disclosure of which is incorporated herein by reference.

BACKGROUND

The present invention generally relates to a distributed storage system including a plurality of storage nodes.

In a storage system, a queue is used to manage I/O (Input/Output) commands. Japanese Patent Laid-Open No. 2010-20694 discloses a technology relating to the use of the queue in the storage system, for example. Patent Literature 1 describes a storage device that "comprises an allocation count managing unit 13 that manages, for a command-sending/receiving pair comprising an external device 1 and a logical device receiving a data input or output request command, the number of command-processing resources to be allocated to that command-sending/receiving pair, and an allocation control unit 14 that allocates, for the command-sending/receiving pair, the data input/output-requiring commands to the command-processing resources with an upper limit value of the number of command-processing resources being the number of command-processing resources to be allocated that is managed by the allocation count managing unit 13".

Patent Literature 1: Japanese Patent Laid-Open No. 2010-20694

SUMMARY

There has been known a distributed storage system including a plurality of storage nodes associated with a plurality of drives. The distributed storage system receives an I/O command specifying an address of a VOL (logical volume) (hereinafter, referred to as a Host-IO) from a host system, and issues one or more (typically, a plurality of) I/O commands (hereinafter, referred to as Drive-IOs) for one or more drives on the basis of the Host-IO. The Drive-IO specifies an address of an issue destination drive.

In the distributed storage system managing a queue in which the I/O command is accumulated, each storage node manages a queue in which the Drive-IO issued for the drive is accumulated (hereinafter, referred to as an actual queue). An actual queue group (one or more actual queues) is managed for one drive.

In general, an IO upper limit value (an upper limit value of the number of Drive-IOs) is determined for each drive on the basis of hardware specifications of the drive. The Drive-IOs the number of which exceeds the IO upper limit value cannot be accumulated in the actual queue group for each drive.

Each storage node includes one or more controllers (hereinafter, referred to as CTLs). Each CTL can receive the Host-IO and issue the Drive-IO. Each CTL has at least a coupled drive of a coupled drive and a non-coupled drive. For each CTL, the coupled drive is a drive physically coupled to the CTL (in other words, a drive accessible without via another CTL), and the non-coupled drive is a drive not physically couple to the CTL (in other words, a drive accessible via another CTL).

The distributed storage system has at least one of first and second problems described below.

The first problem is as below. In a case where in each CTL, an IO upper limit value for the CTL is set for each coupled drive of the CTL, and the same coupled drive is present for two or more CTLs, an IO upper limit value for the CTL set for each of those two or more CTLs is smaller than the IO upper limit value for the coupled drive. For example, the IO upper limit value for the CTL is a value obtained by dividing the IO upper limit value for the coupled drive by the number of CTLs sharing the coupled drive. This is because if the IO upper limit value for the coupled drive is set for every CTL, the Drive-IOs the number of which exceeds the IO upper limit value for the coupled drive may be transmitted to the coupled drive. For this reason, in each CTL, because the number of issued Drive-IOs reaches the IO upper limit value for the CTL, the Drive-IO may not be issued even if the coupled drive is available (or, an error occurs even if issued) This may occur with higher possibility as the number of CTLs sharing the coupled drive is larger. As a result, a performance of the CTL is not sufficiently exerted.

The second problem is that even if the CTL receiving the Host-IO issues the Drive-IO on the basis of the Host-IO, in a case where the issue destination drive of the Drive-IO is a non-coupled drive of the CTL, transfer of the Drive-IO between the CTL is needed, but in a case where the actual queue group corresponding to the drive is full in a transfer destination CTL (in a case where the number of IOs reaches the IO upper limit value for the transfer destination CTL), the Drive-IO cannot be transferred. In this case, an overhead may be generated such as a retry of the transfer between the CTLs.

At least one of the above first and second problems may degrade the IO performance of the distributed storage system.

Patent Literature 1 does not disclose or suggest such problems or means for solving such problems. Specifically, Japanese Patent Laid-Open No. 2010-20694 does not disclose the distributed storage system, and does not disclose queue managing of the Drive-IO.

The distributed storage system providing logical volumes to a host system includes a plurality of storage nodes associated with a plurality of drives. Each of the plurality of storage nodes includes one or more controllers. Each controller has a coupled drive which is a drive physically coupled to the controller in the plurality of drives. In a case where each controller receives a Host-IO from the host system or another controller, the Host-IO being transmitted from the host system and being an I/O (Input/Output) command specifying an address of the logical volume, the controller issues a Drive-IO on the basis of the received Host-IO, the Drive-IO being an I/O command specifying an address of a drive. Each controller includes an actual queue group containing one or more actual queues for each coupled drive of the controller, and a virtual queue group containing one or more virtual queues for each of the plurality of drives. Each actual queue is a queue in which the Drive-IO to be acquired and transmitted to the drive is accumulated. Each virtual queue is a queue in which the Drive-IO issued and received is accumulated. A target Drive-IO which is the Drive-IO issued by any controller and received is accumulated in the actual queue group corresponding to an issue destination drive of the target Drive-IO after accumulated in the virtual queue group corresponding to the issue destination drive.

The queue managing of the Drive-IO is improved, contributing to the I/O performance improvement of the distributed storage system.

BRIEF DESCRIPTION OF THE DRAWINGS

FIG. 3 illustrates an exemplary configuration of a configuration table;

FIG. 4 illustrates an exemplary configuration of an ownership table;

FIG. 5 illustrates an exemplary configuration of a contract flag table;

FIG. 6 illustrates an exemplary configuration of a virtual-queue managing table;

FIG. 7 illustrates an exemplary configuration of an actual-queue managing table;

DESCRIPTION OF EMBODIMENTS

Figure 1:
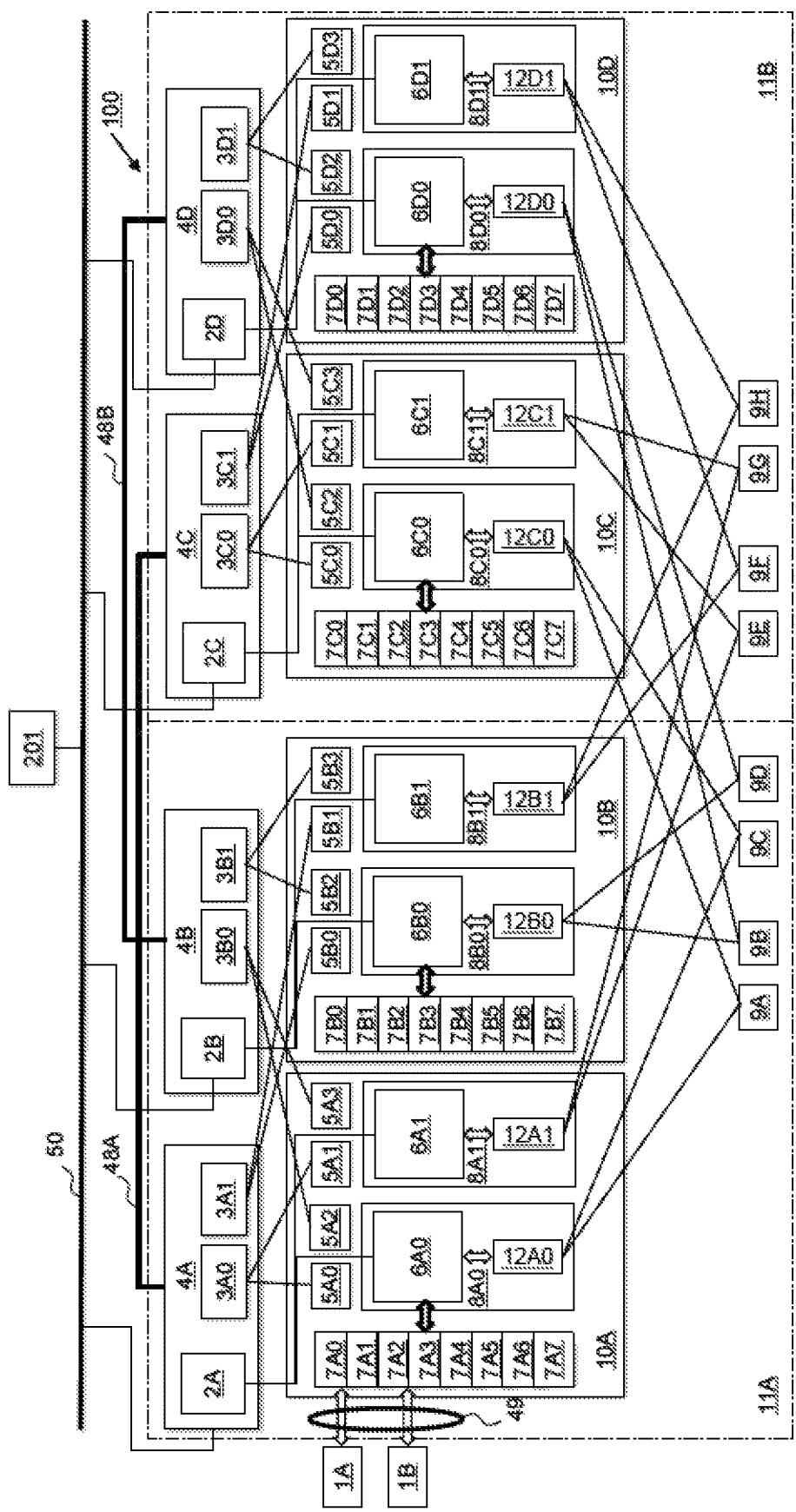
FIG. 1 illustrates an exemplary configuration of an entire system according to an embodiment of the present invention.

In the following description, the term "interface apparatus" may refer to one or more interface devices. The relevant one or more interface devices may be one or more communication interface devices of the same type (e.g., one or more NICs (Network Interface Cards)), or two or more different communication interface devices (e.g., a NIC and an HBA (Host Bus Adapter)).

In the following description, the term "memory" may refer to one or more memory devices, and typically, a primary storage device. At least one memory device in the memory may be a volatile memory device or a non-volatile memory device.

In the following description, the term "drive" refers to a non-volatile storage device (e.g., an auxiliary storage device), specifically, an HDD (Hard Disk Drive) or an SSD (Solid State Drive), for example. A plurality of drives may constitute one or more RAID (Redundant Array of Independent (or Inexpensive) Disks) groups. The RAID group may be constituted by two or more drives and referred to as a parity group.

In the following description, the term "processor" refers to one or more processor devices. At least one processor device may be typically a microprocessor device such as a CPU (Central Processing Unit), but may be another type of processor device such as a GPU(Graphics Processing Unit). At least one processor device may be single-core or multi-core. At least one processor device may be processor core. At least one processor device may be a processor device in a broad sense such as a hardware circuit performing a part or all of processing (e.g., a FPGA (Field-Programmable Gate Array) or an ASIC (Application Specific Integrated Circuit)).

In the following description, an expression such as a "xxx table" may be used to explain information from which an output corresponding to an input is obtained, but the information may be data having any structure, or a learning model such as a neural network in which an output corresponding to an input is generated. Accordingly, the "xxx table" may be referred to as "xxx information". In the following description, a configuration of each table is an example, and one table may be divided into two or more tables, or a part or all of two or more tables may be one table.

In the following description, an expression of a "kkk unit" is used to explain a function, the function may be realized by a processor executing one or more computer programs, or realized by one or more hardware circuits (e.g., a FPGA or an ASIC). In the case where the function is realized by the processor executing the program, predefined processing is performed using appropriately the memory and/or the interface apparatus or the like, and therefore, the function may be considered as at least a part of the processor. The processing explained to be performed by the function as a subject may be considered as the processing performed by the processor or an apparatus included in the processor. A program may be installed from a program source. The program source may be a program distribution computer or a computer-readable recording medium (e.g., a non-transitory recording medium), for example. The explanation of each function is an example, and a plurality of functions may be combined into one function, or one function may be divided into a plurality of functions.

In the following description, the word "VOL" is an abbreviation for logical volume, and may be refer to a logical storage device. The VOL may be an actual VOL (RVOL) or a virtual VOL (VVOL). The "RVOL" may refer to a VOL based on a persistent storage apparatus included in a storage system providing the RVOL. The "VVOL" may be constituted by a plurality of virtual areas (virtual storage areas), and may refer to a VOL complying with a capacity virtualization technology (typically, Thin Provisioning). The term "pool" may refer to a storage area constituted by a plurality of real areas (actual storage areas) (e.g., a set of a plurality of VOLs). In a case where a real area is not allocated to a virtual area to which an address specified by a write request received by a storage system from a host system, a real area may be allocated from the pool to the virtual area.

In the following description, the "host system" may refer to one or more physical host computers, or one or more virtual host computers realized based on physical computational resources (e.g., a processor and a memory). Hereinafter, a host system is abbreviated as a "host".

In the following description, an identification number is used as an ID (identification information), where another sign may be used instead of or in addition to the number.

Hereinafter, an embodiment is described on the basis of the drawings.

FIG. 1 illustrates an exemplary configuration of an entire system according to the embodiment. In the following description, in a case where similar components are described without distinction, a shared part of a reference sign may be used, and in a case where similar components are distinguished, a reference sign of each component may be used. For example, in a case where hosts are not distinguished, each of the hosts is referred to as a "host 1", and in a case where the hosts are distinguished, the hosts may be referred to as a "host 1A" and a "host 1B".

A plurality of hosts 1 (or one host 1) are coupled to a distributed storage system 100 which includes a plurality of storage modules (hereinafter, referred to as modules) 11. Each module 11 includes one or more storage nodes (hereinafter, referred to as nodes) 10 and one or more drive boxes 9. Each node 10 may be a general-purpose computer, but is a storage apparatus having a redundant configuration in the embodiment. The drive box 9 includes one or more drives. The drive box 9 may include one or more RAID groups. Two or more drives in two or more drive boxes 9 may constitute one RAID group.

Each host 1 is communicably coupled to at least one node 10 of a plurality of nodes 10 in the distributed storage system 100 via a network 49.

The distributed storage system 100 and a storage managing server 201 are coupled to a network 50 different from (or the same as) the network 49. The network(s) 50 (and 49) may be one or more networks including a Fibre Channel, an Ethernet (registered trademark), an InfiniBand, a LAN (Local Area Network), or the like.

The distributed storage system 100 includes one or a plurality of SNs (Service and Network boxes) 4. One or a plurality of SNs 4 are coupled to the managing server 201 via the network 50, and coupled to each of a plurality of nodes 10. The SN 4 is an example of a switch apparatus. The SN 4 is coupled to another SN 4 via a leased line 48 (or the network 50).

Each SN 4 has a configuration as described below, for example, using a SN 4A as an example. Specifically, the SN 4A includes a managing terminal 2A and an ISW (Interconnect-Switch) group. The managing terminal 2A is a computer including a processor and a memory. The managing terminal 2A is communicable coupled to the managing server 201 via the network 50. The ISW group includes one or more ISWs 3, or redundant ISWs 3A0 and 3A1 in the embodiment. Each ISW 3 is a switch apparatus coupling to redundant controllers 6A0 and 6A1 described later via redundant IEs 5A0 and 5A1 described later, respectively.

Each node 10 has a configuration as described below, for example, using a node 10A as an example. The node 10A includes a plurality of FE-IF (Front End Interface) groups (or one FE-IF group), one CTL unit group (or a plurality of CTL unit groups), and a plurality of IE (Interconnect-Edge) groups or one IE group.

Each FE-IF group includes redundant FE-IFs 7 (e.g., FE-IFs 7A0 and 7A1 are the redundant FE-IFs 7). Each FE-IF 7 is an interface device receiving a Host-IO from the host 1.

The CTL unit group includes redundant CTL units 8A0 and 8A1. For example, the CTL unit 8A0 includes the CTL (controller) 6A0 and a BE-IF (Back End Interface)12A0 coupled to the CTL 6A0. The CTL 6A0 is a computer including a processor and a memory, for example. The managing terminal 2A is coupled to the CTL 6A0 (and the CTL 6A1) via a LAN, for example. The BE-IF 12A0 is an interface device communicating with the drives in the drive boxes 9A and 9E.

Each IE group includes a redundant IE 5. For example, the IEs 5A0 and 5A1 are the redundant IEs. The IE 5 is coupled to any ISW 3 in any SN 4 via a LAN (Local Area Network), for example. The IE 5 is coupled to any CTL 6. Specifically, the IE 5 is an interface device for coupling the ISW 3 to the CTL 6. For example, the IE 5A0 is an interface device for coupling the ISW 3A0 to the CTL 6A0.

In the embodiment, the distributed storage system 100 is configured to be able to input or output data in accordance with a HOST-IO from the host 1 to and from any drive box 9 via any node 10. For example, the module 11 is also redundant. Any of the nodes 10A and 10B in a module 11A can access the drive boxes 9A to 9D in a module 11A, and drive boxes 9E to 9H in the module 11B. Similarly, any of nodes 10C and 10D in the module 11B can access the drive boxes 9E to 9H in the module 11B, and drive boxes 9A to 9D in the module 11A. The HOST-IO from the host 1 may be received by any of the FE-IFs 7A to 7D included in the nodes 10A to 10D, and may be processed by any of the CTLs 6A to 6D included in the nodes 10A to 10D. Specifically, for example, in a case where the HOST-IO is received by the node 10A, but the node 10D is responsible to processing of the HOST-IO (e.g., the node 10D is responsible to a volume specified by the HOST-IO), the HOST-IO received by the CTL 6A0 or A1 via any of the FE-IEs 7A0 to 7A7 is transferred to the CTL 6D0 or 6D1 through a path (P) or (Q) described below, and one or more Drive-IOs on the basis of the HOST-IO are transmitted by the CTL 6D0 or 6D1 via the BE-IF 12D0 or 12D1 to a drive in any of the drive boxes 9A to 9H.

(P) IE 5A0 or 5A1, ISW 3A0, SN 4A, leased line 48A, SN 4C, ISW 3C1, and IE 5D0 or 5D1.

(Q) IE 5A2 or 5A3, ISW 3B0, SN 4B, leased line 48B, SN 4D, ISW 3D1, and IE 5D2 or 5D3.

In the distributed storage system 100, the managing server 201 is configured to be communicable with any node 10 via the network 50. Specifically, for example, the managing server 201 can acquire configuration information from the nodes 10A to 10D via the managing terminals 2A to 2D in the SNs 4A to 4D, respectively.

According to the example in FIG. 1, in each node 10, an example of the interface apparatus includes a plurality of FE-IEs 7, a plurality of IEs 5, and a plurality of BE-IFs 12, an example of the memory includes a plurality of memories in a plurality of CTLs 6, and an example of the processor includes a plurality of CPUs in a plurality of CTLs. An example of a plurality of drives associated with a plurality of nodes 10 includes a plurality of drive boxes 9.

According to FIG. 1, for example, a coupled drive (a drive physically coupled) for the CTL 6A0 includes the drives in the drive boxes 9A and 9C, and a non-coupled drive (a drive not physically coupled) includes the drives in the drive boxes 9B, 9D, and 9E to 9H.

Figure 2:
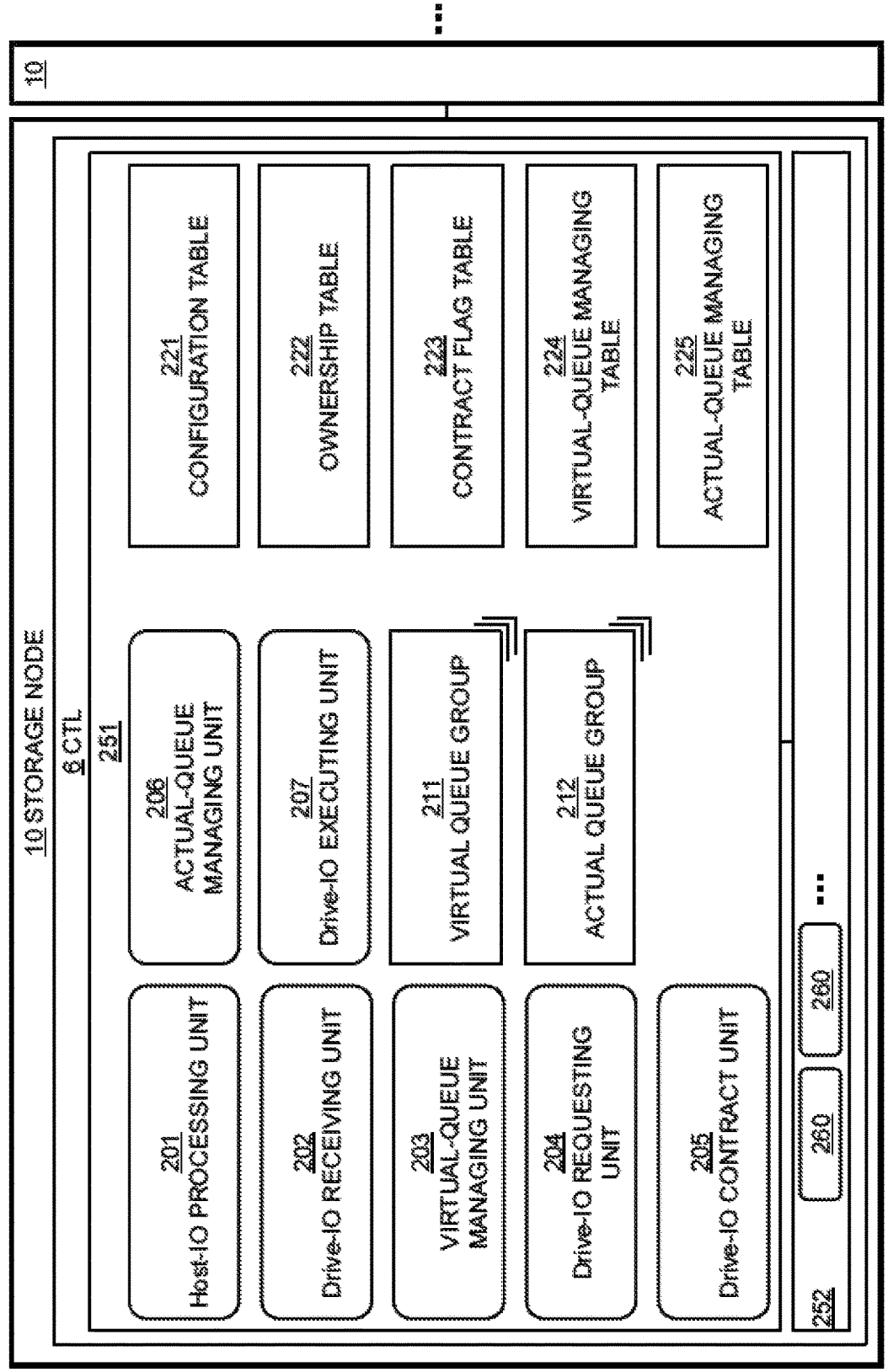
FIG. 2 illustrates an example of a function and table of a CTL 6.

FIG. 2 illustrates an example of a function and table of the CTL 6.

The CTL 6 includes a memory 251 and a processor 252 coupled to the memory 251. The processor 252 includes a plurality of CPUs, and each CPU includes a plurality of processor cores 260. The processor core 260 may be a microprocessor, for example.

The memory 251 stores one or more computer programs therein which are executed by the processor 252 to realize a Host-IO processing unit 201, a Drive-IO receiving unit 202, a virtual-queue managing unit 203, a Drive-IO requesting unit 204, a Drive-IO contract unit 205, an actual-queue managing unit 206, and a Drive-IO executing unit 207. The Host-IO processing unit 201 processes a Host-IO from the host 1 or another CTL 6, for example, issues a Drive-IO on the basis of the Host-IO. The Drive-IO receiving unit 202 receives the issued Drive-IO. The virtual-queue managing unit 203 manages a virtual queue group 211 described later. The Drive-IO requesting unit 204 transfers the Drive-IO to another CTL 6. The Drive-IO contract unit 205 receives a Drive-IO transferred by a Drive-IO requesting unit 204 of another CTL 6. The actual-queue managing unit 206 manages an actual queue group 212 described later. The Drive-IO executing unit 207 executes the Drive-IO received by the Drive-IO receiving unit 202 or the Drive-IO contract unit 205 (that is, the Drive-IO for the coupled drive) (or transmits the Drive-IO to the drive).

The memory 251 is provided, for each of the coupled drives of the relevant CTL 6 among the all drives in the distributed storage system 100, with an actual queue group 212 (one or more actual queues) corresponding to the coupled drive. In addition, the memory 251 is provided with, for each of the all drives in the distributed storage system 100, a virtual queue group 211 (one or more virtual queues) corresponding to the drive.

Each actual queue is a queue in which the Drive-IO to be transmitted to the drive is accumulated. Each virtual queue is a queue in which the issued and received Drive-IO is accumulated. The Drive-IO issued by any CTL 6 and received is accumulated in the actual queue group 212 corresponding to an issue destination drive of the Drive-IO after accumulated in the virtual queue group 211 corresponding to the issue destination drive.

The memory 251 stores therein management information including a plurality of tables such as a configuration table 221, and ownership table 222, a contract flag table 223, a virtual-queue managing table 224, and an actual-queue managing table 225.

The tables 221 to 225 are described with reference to FIG. 3 to FIG. 7.

FIG. 3 illustrates an exemplary configuration of the configuration table 221.

The configuration table 221 shows a relationship between the drive, the VOL and the CTL. Specifically, the configuration table 221 has an entry for each drive, for example. Each entry holds information such as a drive #301, a drive address 302, a VOL address 303, and a CTL #304. One drive is used as an example for description (that is, a "drive of interest" in a description of FIG. 3).

The drive #301 indicates an identification number of the drive of interest. The drive address 302 indicates an address belonging to a storage space provided by the drive of interest (e.g., LBA (Logical Block Address)). The VOL address 303 indicates a combination of an identification number of a VOL on the basis of the drive of interest and an address belonging to the VOL (e.g., LBA), and is information corresponding to an address of the drive of interest. The CTL # indicates an identification number of the CTL 6 of which the coupled drive is the drive of interest.

The Host-IO processing unit 201 can issue (generate) one or more Drive-IOs corresponding to the relevant Host-IO based on the VOL address described in the Host-IO and the configuration table 221.

FIG. 4 illustrates an exemplary configuration of the ownership table 222.

The ownership table 222 indicates a relationship between the VOL provided to the host 1 and an owner CTL of the VOL. Specifically, the ownership table 222 has an entry for each VOL, for example. Each entry holds information such as a VOL #401 and a CTL #402. One VOL is used as an example for description (that is, a "VOL of interest" in a description of FIG. 4).

The VOL #401 indicates an identification number of the VOL of interest. The CTL #402 indicates an identification number of the CTL 6 having an ownership of the VOL of interest. The CTL 6 having the ownership of the VOL of interest issues a Drive-IO on the basis of a Host-IO specifying the VOL of interest.

FIG. 5 illustrates an exemplary configuration of the contract flag table 223.

The contract flag table 223 is a table indicating whether or not a CTL 6 from which the Drive-IO for the coupled drive of a CTL 6 having the table 223 (that is a "CTL 6 of itself" in a description of FIG. 5) is received is the CTL 6 of itself. Specifically, the contract flag table 223 has an entry for each coupled drive, for example. Each entry holds information such as a coupled drive #501 and a contract flag #502. One coupled drive is used as an example for description (that is, a "coupled drive of interest" in a description of FIG. 5).

The coupled drive #501 indicates an identification number of the coupled drive of interest. The contract flag #502 indicates whether the Drive-IO for the coupled drive of interest is received from other CTL 6 than the CTL 6 of itself ("ON") or not ("OFF").

FIG. 6 illustrates an exemplary configuration of the virtual-queue managing table 224.

The virtual-queue managing table 224 indicates a virtual upper limit value and usage condition for each virtual queue group 211. Specifically, the virtual-queue managing table 224 has an entry for each of the all drives in the distributed storage system 100, for example. Each entry holds information such as a drive #601, a virtual upper limit value 602 and the number of IOs 603. One drive is used as an example for description (that is, a "drive of interest" in a description of FIG. 6).

The drive #601 indicates an identification number of the drive of interest. The virtual upper limit value 602 indicates a virtual upper limit value corresponding to the drive of interest (the upper limit of the number of Drive-IOs accumulable in the virtual queue group 211 corresponding to that drive). The number of IOs 603 indicates the number of IOs for each of the processor cores present in the CTL 6 having the table 224 (that is, the number of Drive-IOs accumulated in the virtual queue corresponding to the core). A total of the numbers of Drive-IOs accumulated in the virtual queues respectively corresponding to one or more processor cores included in the CTL 6 for the drive of interest is the number of Drive-IOs accumulated in the virtual queue group 211 corresponding to the drive of interest. The total for the drive of interest is restricted by the virtual-queue managing unit 203 to equal to or smaller than the virtual upper limit value corresponding to the drive of interest.

The virtual upper limit value 602 corresponding to the drive of interest is, for example, a value on the basis of the upper limit value complying with hardware specifications of the drive of interest (e.g., the relevant upper limit value complying with the hardware specifications, or a value obtained by subtracting a value defined for maintenance from the upper limit value).

FIG. 7 illustrates an exemplary configuration of the actual-queue managing table 225.

The actual-queue managing table 225 indicates an actual upper limit value and usage condition for each actual queue group 212. Specifically, the actual-queue managing table 225 has an entry for each coupled drive in the table 225, for example. Each entry holds information such as a coupled drive #701, an actual upper limit value 702, and the number of IOs 703. One coupled drive is used as an example for description (that is, a "coupled drive of interest" in a description of FIG. 7).

The coupled drive #701 indicates an identification number of the coupled drive of interest. The actual upper limit value 702 indicates an actual upper limit value corresponding to the coupled drive of interest (the upper limit of the number of Drive-IOs accumulable in the actual queue group 212 corresponding to that coupled drive). The number of IOs 703 indicates the number of IOs for each of the processor cores present in the CTL 6 having the table 225 (the number of Drive-IOs accumulated in the actual queue corresponding to the core). A total of the numbers of Drive-IOs accumulated in the actual queues respectively corresponding to one or more processor cores included in the CTL 6 for the coupled drive of interest is the number of Drive-IOs accumulated in the actual queue group 212 corresponding to the coupled drive of interest. The total for the coupled drive of interest is restricted by the actual-queue managing unit 206 to equal to or smaller than the actual upper limit value corresponding to the drive of interest.

The actual upper limit value 702 corresponding to the drive of interest may be a value obtained by dividing the virtual upper limit value 602 corresponding to the drive of interest by the number of the CTLs 6 of which the coupled drives are each the drive of interest (e.g., round down decimal places), for example. The actual upper limit value 702 is an upper limit value for the CTL 6 having that table 225.

In the embodiment, a CTL receiving the issued Drive-IO is referred to as a "receiving CTL". The CTL transmitting the Drive-IO to the drive is referred to as an "executing CTL". Hereinafter, a description is given of a process overview in cases where the receiving CTL and the executing CTL are the same and are different.

Figure 8:
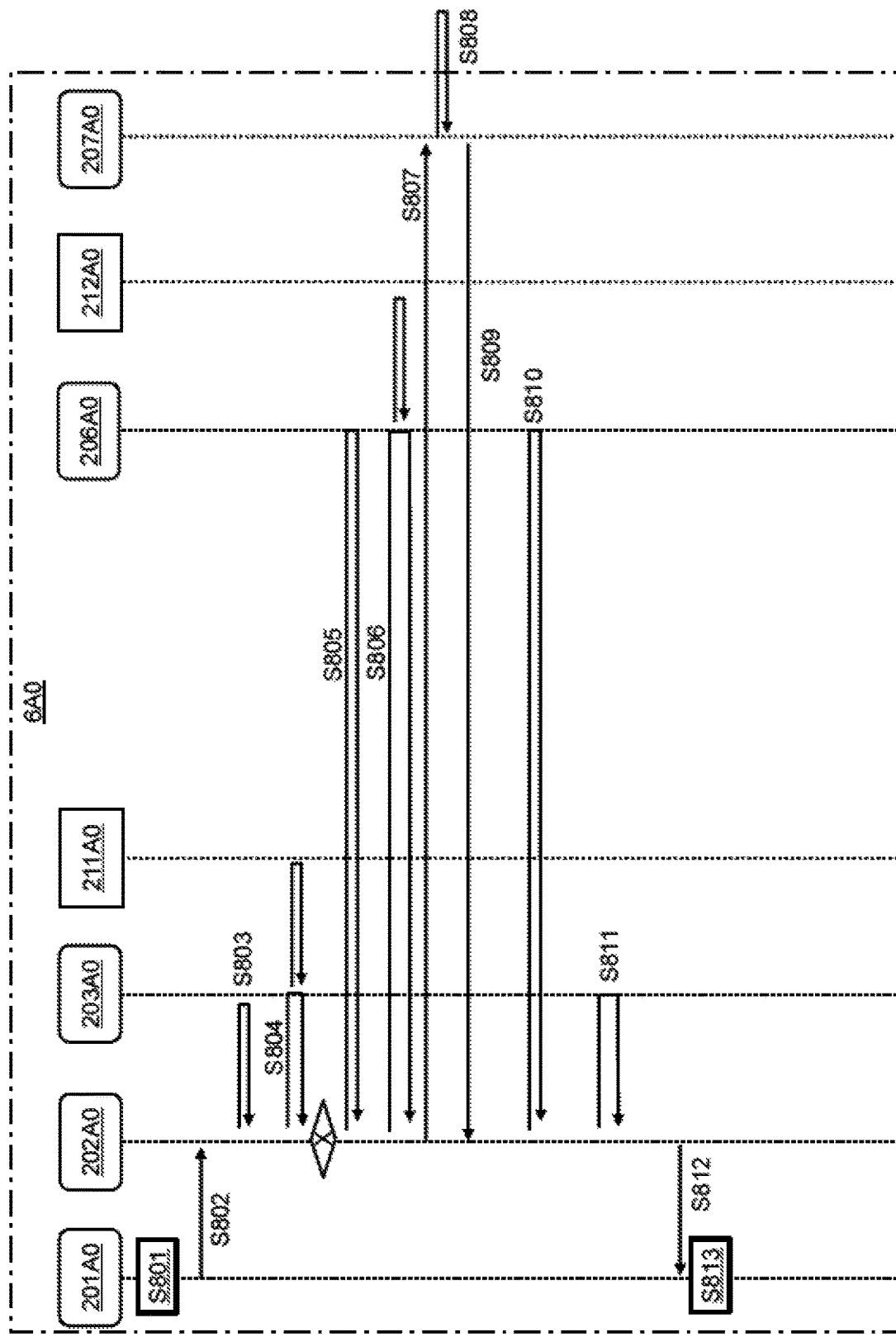
FIG. 8 illustrates an overview of an example of a process flow in a case where a receiving CTL is the same as an executing CTL.

FIG. 8 illustrates an overview of an example of a process flow in the case where the receiving CTL is the same as the executing CTL. In the example of FIG. 8, both the receiving CTL and the executing CTL are the CTL 6A0. In the description of FIG. 8, reference signs of the components included in the CTL 6A0 are adequately suffixed by "A0".

At S801, the Host-IO processing unit 201A0 receives a Host-IO from the host 1. An owner CTL determination is made. Specifically, the Host-IO processing unit 201A0 refers to the ownership table 222A0 to determine whether or not the CTL 6A0 has an ownership of a VOL specified by the Host-IO (that is, a "VOL of interest" in the description of FIG. 8). In a case where a result of the determination is false, the Host-IO processing unit 201A0 transfers the Host-IO to a CTL having the ownership of the VOL of interest. In a case where the result of the determination is true, the Host-IO processing unit 201A0 performs S802.

At S802, the Host-IO processing unit 201A0 issues a Drive-IO on the basis of the Host-IO. For the purpose of easy explanation, one Drive-IO is focused on in the following description of FIG. 8. This one Drive-IO is referred to as a "Drive-IO of interest" in the description of FIG. 8, and an issue destination drive of the Drive-IO of interest is referred to as a "drive of interest". The Drive-IO receiving unit 202A0 receives the issued Drive-IO of interest.

At S803, the Drive-IO receiving unit 202A0 inquires of the virtual-queue managing unit 203A0 whether or not the virtual queue group 211 corresponding to the drive of interest is available. The virtual-queue managing unit 203A0 refers to the virtual-queue managing table 224A0 to answer to the Drive-IO receiving unit 202A on whether or not the virtual queue group 211 corresponding to the drive of interest is available. If the total of the numbers of Drive-IOs obtained from the number of IOs 603 corresponding to the drive of interest is smaller than the virtual upper limit value 602 corresponding to the drive of interest, the virtual queue group 211 is available.

In a case where the virtual queue group 211 is available, the Drive-IO receiving unit 202A0, at S804, makes the virtual-queue managing unit 203A0 secure a queue resource from the virtual queue group 211A0 corresponding to the drive of interest to accumulate the Drive-IO of interest in the secured queue resource. This increases by one the number of IOs of the virtual queue corresponding to the processor core associated with execution of the Drive-IO of interest (the number of IOs corresponding to that core in the number of IOs 603A0 increases by one).

Here, a determination X is made. Specifically, the Drive-IO receiving unit 202A0 refers to the configuration table 221A0 to determine whether or not the drive of interest is the coupled drive of the CTL 6A0. Here, a result of the determination is true. In other words, both the receiving CTL and the executing CTL are the CTL 6A0. Therefore, S805 is performed.

At S805, the Drive-IO receiving unit 202A0 inquires of the actual-queue managing unit 206A0 whether or not the actual queue group 212 corresponding to the drive of interest is available. The actual-queue managing unit 206A0 refers to the actual-queue managing table 225A0 to answer to the Drive-IO receiving unit 202A0 on whether or not the actual queue group 212A0 corresponding to the drive of interest is available. If the total of the numbers of Drive-IOs obtained from the number of IOs 703A0 corresponding to the drive of interest is smaller than the actual upper limit value 702A0 corresponding to the drive of interest, the actual queue group 212A0 is available.

In a case where the actual queue group 212A0 is available, the Drive-IO receiving unit 202A0, at S806, makes the actual-queue managing unit 206A0 secure a queue resource from the actual queue group 212A0 corresponding to the drive of interest to accumulate the Drive-IO of interest in the secured queue resource from the virtual queue group 211A0, for example. This increases by one the number of IOs of the actual queue corresponding to the processor core associated with execution of the Drive-IO of interest (the number of IOs corresponding to that core in the number of IOs 703A0 increases by one).

At S807, the Drive-IO receiving unit 202A0 makes the Drive-IO executing unit 207A0 execute the Drive-IO of interest accumulated in the actual queue group 212A0 corresponding to the drive of interest. This allows the Drive-IO executing unit 207A0 to execute the I/O for the drive of interest at S808.

At S809, the Drive-IO receiving unit 202A0 receives a result of executing the Drive-IO of interest from the Drive-IO executing unit 207A0.

At S810, the Drive-IO receiving unit 202A0 makes the actual-queue managing unit 206A0 free the queue resource for the Drive-IO of interest from the actual queue group 212A0. This decreases by one the number of IOs of the actual queue corresponding to the processor core associated with the execution of the Drive-IO of interest (the number of IOs corresponding to that core in the number of IOs 703A0 decreases by one).

At S811, the Drive-IO receiving unit 202A0 makes the virtual-queue managing unit 203A0 free the queue resource for the Drive-IO of interest from the virtual queue group 211A0. This decreases by one the number of IOs of the virtual queue corresponding to the processor core associated with the execution of the Drive-IO of interest (the number of IOs corresponding to that core in the number of IOs 603A0 decreases by one).

At S812, the Drive-IO receiving unit 202A0 returns the result of executing the Drive-IO of interest to the Host-IO processing unit 201A0.

At S5813, the Host-IO processing unit 201A0 returns a response to the Host-IO received at S801.

Figure 9:
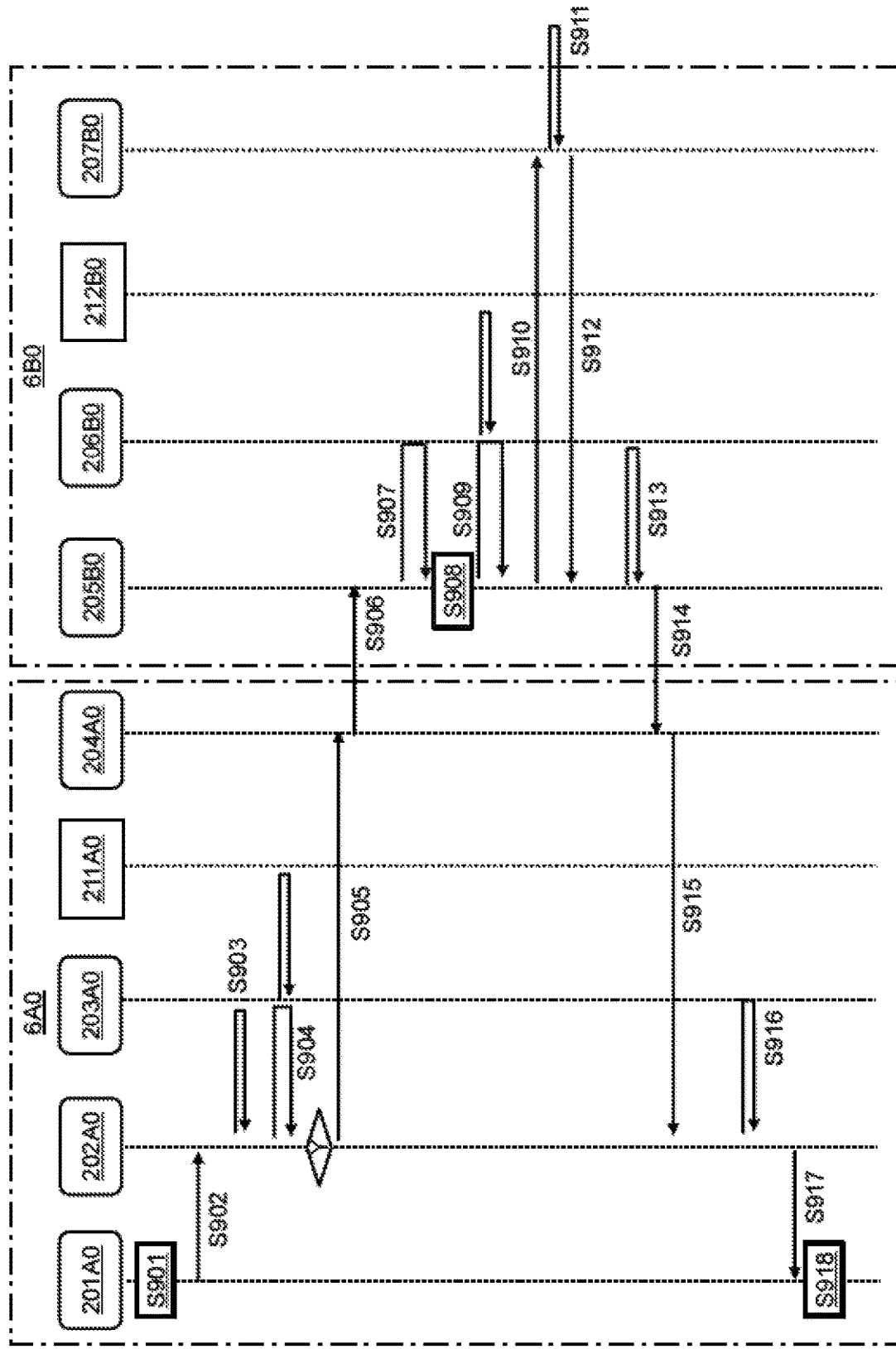
FIG. 9 illustrates an overview of an example of a process flow in a case where a receiving CTL is different from an executing CTL.

FIG. 9 illustrates an overview of an example of a process flow in a case where the receiving CTL is different from the executing CTL. In the example of FIG. 9, the receiving CTL is the CTL 6A0 and the executing CTL is the CTL 6B0. In the description of FIG. 9, reference signs of the components included in the CTL 6A0 are adequately suffixed by "A0", and reference signs of the components included in the CTL 6B0 are adequately suffixed by "B0".

At S901, the Host-IO processing unit 201A0 receives a Host-IO from the host 1. An owner CTL determination is made (detailed description is already described above, and therefore, is omitted here). A VOL specified by the received Host-IO is referred to as a "VOL of interest" in the description of FIG. 9. Here, because the CTL 6A0 has the ownership of the VOL of interest, the Host-IO processing unit 201A0 performs S902.

At S902, the Host-IO processing unit 201A0 issues a Drive-IO on the basis of the Host-IO. For the purpose of easy explanation, one Drive-IO is focused on in the following description of FIG. 9. This one Drive-IO is referred to as a "Drive-IO of interest" in the description of FIG. 9, and an issue destination drive of the Drive-IO of interest is referred to as a "drive of interest". The Drive-IO receiving unit 202A0 receives the issued Drive-IO of interest.

S903, S904, and a determination Y are performed. S903, S904, and the determination Y are the same as the S803, S804, and the determination X described above, respectively. Therefore, S905 is performed.

At S905, the Drive-IO receiving unit 202A0 instructs the Drive-IO requesting unit 204A0 to transfer the Drive-IO of interest to the CTL 6B0 of which the coupled drive is drive of interest.

At S906, the Drive-IO requesting unit 204 transfers the Drive-IO of interest to the CTL 6B0. The Drive-IO contract unit 205B0 in the CTL 6B0 receives the transferred Drive-IO of interest.

At S907, the Drive-IO contract unit 205B0 inquires of the actual-queue managing unit 206B0 whether or not the actual queue group 212 corresponding to the drive of interest is available. The actual-queue managing unit 206B0 refers to the actual-queue managing table 225B0 to answer to the Drive-IO contract unit 205B0 on whether or not the actual queue group 212B0 corresponding to the drive of interest is available. If the total of the numbers of Drive-IOs obtained from the number of IOs 703B0 corresponding to the drive of interest is smaller than the actual upper limit value 702B0 corresponding to the drive of interest, the actual queue group 212B0 is available.

In a case where the actual queue group 212B0 is available, the Drive-IO contract unit 205B0, at S908, refers to the contract flag table 223B0 to turn "ON" a contract flag 502B0 corresponding to the drive of interest. At S909, the Drive-IO contract unit 205B0 makes the actual-queue managing unit 206B0 secure a queue resource from the actual queue group 212A0 corresponding to the drive of interest to accumulate the Drive-IO of interest in the secured queue resource. This increases by one the number of IOs of the actual queue corresponding to the processor core associated with execution of the Drive-IO of interest (the number of IOs corresponding to that core in the number of IOs 703B0 increases by one).

At S910, the Drive-IO contract unit 205B0 makes the Drive-IO executing unit 207B0 execute the Drive-IO of interest accumulated in the actual queue group 212B0 corresponding to the drive of interest. This allows the Drive-IO executing unit 207B0 to execute the I/O for the drive of interest at S911.

At S912, the Drive-IO contract unit 205B0 receives a result of executing the Drive-IO of interest from the Drive-IO executing unit 207B0.

At S913, the Drive-IO contract unit 205B0 makes the actual-queue managing unit 206B0 free the queue resource for the Drive-IO of interest from the actual queue group 212B0. This decreases by one the number of IOs of the actual queue corresponding to the processor core associated with the execution of the Drive-IO of interest (the number of IOs corresponding to that core in the number of IOs 703B0 decreases by one).

At S5914, the Drive-IO contract unit 205B0 returns a result of executing the Drive-IO of interest to the Drive-IO requesting unit 204A0. At S915, the Drive-IO requesting unit 204A0 returns the execution result to the Drive-IO receiving unit 202A0.

At S916, the Drive-IO receiving unit 202A0 makes the virtual-queue managing unit 203A0 free the queue resource for the Drive-IO of interest from the virtual queue group 211A0. This decreases by one the number of IOs of the virtual queue corresponding to the processor core associated with the execution of the Drive-IO of interest (the number of IOs corresponding to that core in the number of IOs 603A0 decreases by one).

At S917, the Drive-IO receiving unit 202A0 returns the result of executing the Drive-IO of interest to the Host-IO processing unit 201A0.

At S918, the Host-IO processing unit 201A0 returns a response to the Host-IO received at S901.

According to the example in FIG. 9, in the executing CTL 6B0, the Drive-IO of interest is accumulated in the actual queue group 212B0 without being accumulated in the virtual queue group 211B0, but instead, the Drive-IO of interest may be accumulated in the virtual queue group 211B0, and thereafter, accumulated from the virtual queue group 211B0 into the actual queue group 212B0.

Figure 10:
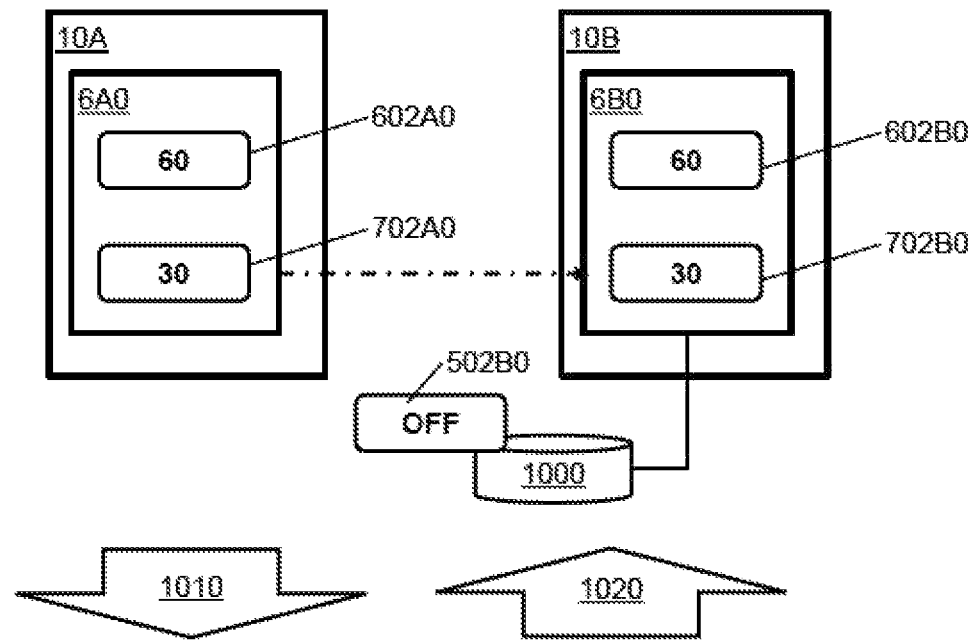
FIG. 10 illustrates an example of a restriction on a virtual upper limit value and a cancel thereof carried out in a case where transfer of a Drive-IO between the CTLs is caused because the receiving CTL is different from the executing CTL.

FIG. 10 illustrates an example of a restriction on the virtual upper limit value and a cancel thereof carried out in a case where transfer of the Drive-IO between the CTLs is caused because the receiving CTL is different from the executing CTL. In FIG. 10, one drive is focused on. This drive is referred to as a "drive of interest" in a description of FIG. 10. A Drive-IO for the drive of interest is referred to as a "Drive-IO of interest" in the description of FIG. 10.

Assume that a default value of the virtual upper limit value 602 for a drive 1000 of interest is an upper limit value complying with hardware specifications of the drive 1000 of interest in any CTL 6. In other words, the virtual upper limit value 602 for the drive 1000 of interest is a total of all the actual upper limit values 602 for the all CTLs 6 of which the coupled drives are each the drive 1000 of interest.

Assume that because the receiving CTL 6A0 is not physically coupled to the drive 1000 of interest, but a CTL physically coupled to the drive 1000 of interest is the CTL 6B0, the Drive-IO of interest is transferred from the receiving CTL 6A0 to the executing CTL 6B as depicted by a dashed-dotted.

In this case, as depicted by an arrow 1010, the Drive-IO contract unit 205B0 turns "ON" the contract flag 502B0 corresponding to the drive 1000 of interest. The virtual-queue managing unit 203B0 reduces the virtual upper limit value 602B0 corresponding to the drive 1000 of interest for which the contract flag 502B0 is "ON". For example, the virtual-queue managing unit 203B0 reduces the virtual upper limit value 602B0 from the default value to the number of processor cores included in the CTL 6B0. This is in order to able to accumulate at least one request for each processor core in the CTL 6B0.

In each CTL 6, adjustment processing periodically runs by the virtual-queue managing unit 203. The "adjustment processing" is processing to adjust the virtual upper limit value 602, to be more specific, processing to return (reset) the virtual upper limit value 602 to the default value, for example. For example, in the CLT6B0, when the adjustment processing runs, the virtual-queue managing unit 203B0 returns the virtual upper limit value 602B0 corresponding to the drive 1000 of interest for which the contract flag 502B0 is "ON" to the default value, and turns "OFF" the contract flag 502B0, as depicted by an arrow 1020.

Figure 11:
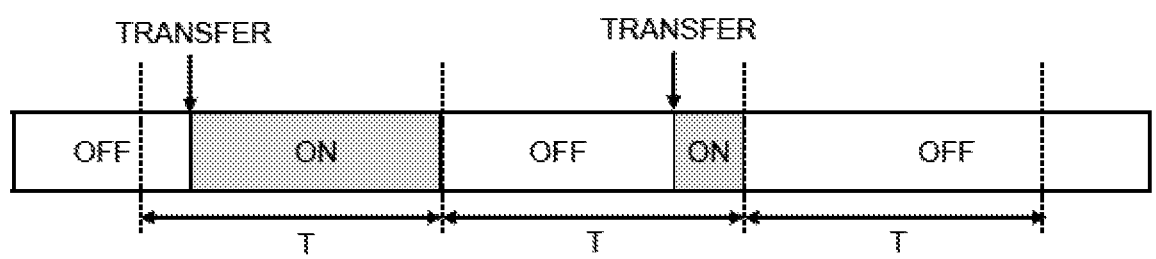
FIG. 11 illustrates an example of a relationship between a contract flag and adjustment processing periodically performed.

FIG. 11 illustrates an example of a relationship between the contract flag and the adjustment processing periodically performed.

The adjustment processing runs with a period T. The contract flag 502 turned "ON" once in a certain period T remains "ON" until the next period T starts (that is, until the adjustment processing runs next time). When the next period T starts, the contract flag 502 is returned from "ON" to "OFF".

Figure 12:
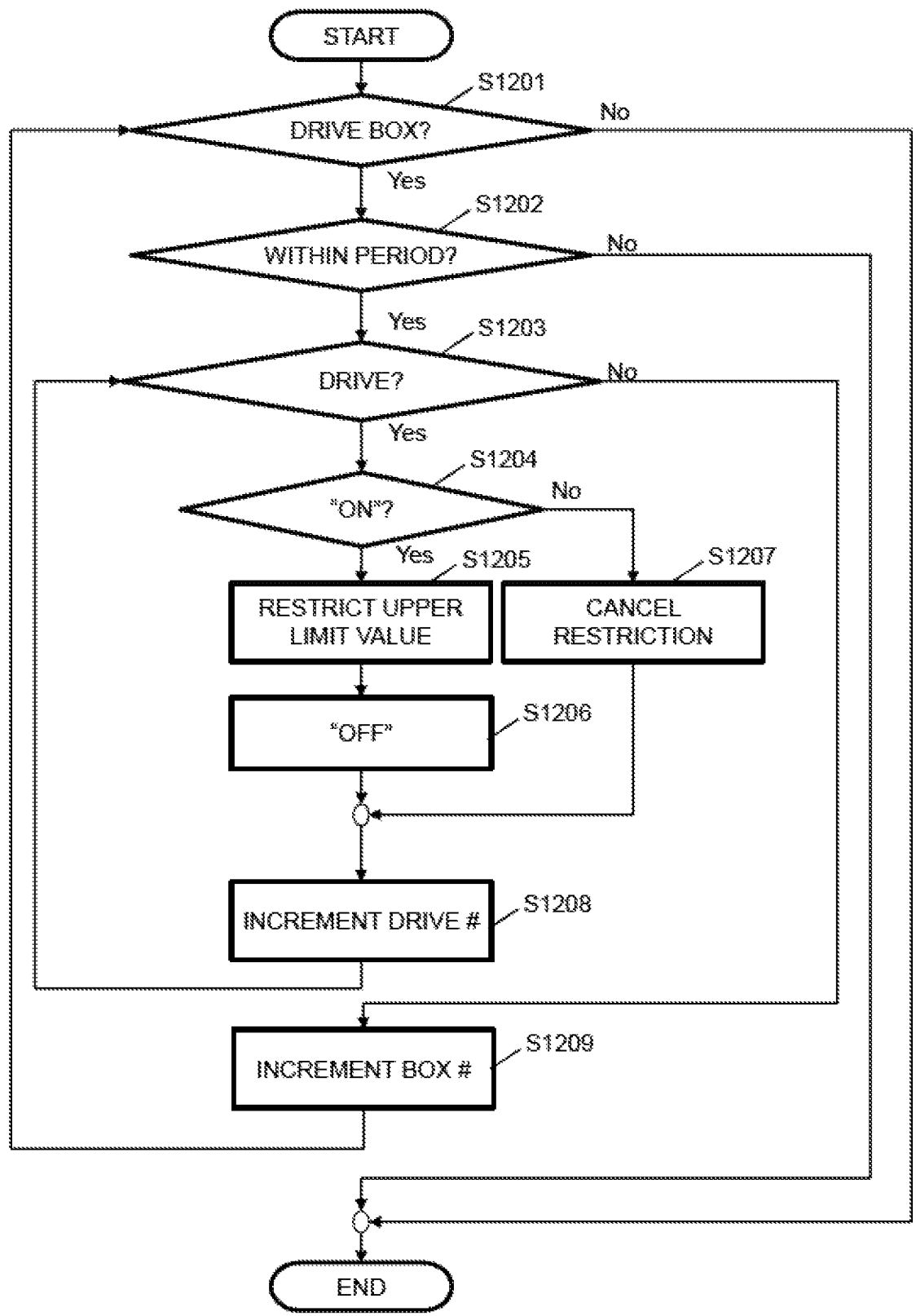
FIG. 12 illustrates an example of a flow of the adjustment processing.

FIG. 12 illustrates an example of a flow of the adjustment processing. The adjustment processing in one CTL 6 is used as an example for description (that is, a "CTL 6 of interest" in a description of FIG. 12).

At S1201, the virtual-queue managing unit 203 determines whether or not there is the drive box 9 still not subjected to the adjustment processing (unprocessed box 9) among all the drive boxes 9 physically coupled to the CTL 6 of interest. A relationship between the drive box 9 and the drive is described in the configuration table 221, and the determination at S1201 may be made based on the configuration table 221. Here, if a box # (an identification number of the drive box 9) set as an object to be processed does not reach the last box #, there is at least one unprocessed box 9, for example. The drive box 9 of the box # set as an object to be processed is the unprocessed box 9 to be processed. In a case where a determination result at S1201 is false, the adjustment processing ends.

In a case where the determination result at S1201 is true, the virtual-queue managing unit 203 at S1202 determines whether or not a present time point is within a time period from the start to the end of the period. In a case where a determination result at S1202 is false, the adjustment processing ends.

In a case where the determination result at S1202 is true, the virtual-queue managing unit 203 at S1203 determines whether or not there is a drive still not subjected to the adjustment processing (unprocessed drive) in the unprocessed box 9 to be processed. Here, if a drive # set as an object to be processed does not reach the last drive # in the unprocessed box 9 to be processed, there is at least one unprocessed drive, for example. The drive of the drive # set as an object to be processed is the unprocessed drive to be processed. In a case where a determination result at S1203 is false, the virtual-queue managing unit 203 at S1209 increments the box # by one.

In a case where the determination result at S1203 is true, the virtual-queue managing unit 203 at S1204 determines whether or not the contract flag 502 corresponding to the unprocessed drive to be processed is "ON".

In a case where a determination result at S1204 is true, the virtual-queue managing unit 203 at S1205 restricts (specifically, reduces) the virtual upper limit value 602 corresponding to the unprocessed drive to be processed. At S1206, the virtual-queue managing unit 203 returns the contract flag 502 corresponding to the unprocessed drive to be processed to "OFF".

On the other hand, in a case where the determination result at S1204 is false, the virtual-queue managing unit 203 at S1207 cancels the restriction on (specifically, returns to the default value) the virtual upper limit value 602 corresponding to the unprocessed drive to be processed.

After S1206 or S1207, the virtual-queue managing unit 203 at S1208 increments by one the drive # set as an object to be processed. After that, S1203 is performed.

Hereinabove, the description of the embodiment is given. The above description may be summarized as below, for example.

The distributed storage system 100 which provides a logical volume to the host 1 includes a plurality of nodes 10 associated with a plurality of drives. Each node 10 includes one or more CTLs 6. Each CTL 6 has the coupled drive which is a drive physically coupled to the CTL 6. Each CTL 6, in the case of receiving from the host 1 or another CTL 6 the Host-IO transmitted from the host 1, issues a Drive-IO on the basis of the received Host-IO. Each CTL 6 includes the actual queue group 212 for each coupled drive of the CTL 6, and in addition, includes the virtual queue group 211 for each drive in the distributed storage system 100. Each actual queue is a queue in which the Drive-IO to be transmitted to the drive is accumulated. Each virtual queue is a queue in which the received Drive-IO is accumulated. A target Drive-IO which is the Drive-IO received by any CTL 6 is accumulated in the actual queue group 212 corresponding to an issue destination drive of the target Drive-IO after accumulated in the virtual queue group 211 corresponding to the issue destination drive. As a result, an I/O performance of the distributed storage system 100 is expected to be improved. This is because even if the actual upper limit value described later corresponding to the actual queue group 212 is small, the accumulation is made first in the virtual queue group 211 corresponding to the issue destination drive, and therefore, the first and second problems described above are expected to be solved.

In each CTL 6, the virtual upper limit value 602 for each drive and the actual upper limit value 702 for each coupled drive are set, the virtual upper limit value 602 being an upper limit of the number of Drive-IOs accumulable in the virtual queue group 211 corresponding to the drive, the actual upper limit value 702 being an upper limit of the number of Drive-IOs accumulable in the actual queue group 212 corresponding to the coupled drive. The upper limit value of the number of Drive-IOs is independent between the virtual queue group 211 and the actual queue group 212. For this reason, even if the actual upper limit value 702 corresponding to the drive is small, the Drive-IO can be expected to be accumulated in the virtual queue group 211 corresponding to the drive.

In each CTL 6, in terms of each drive, the virtual upper limit value 602 corresponding to the drive is the same as or larger than the actual upper limit value 702 set for the CTL 6 of which the coupled drive is the relevant drive. For this reason, even if the actual upper limit value 702 corresponding to the drive is small, the Drive-IO can be expected to be accumulated in the virtual queue group 211 corresponding to the drive.

In each CTL 6, in terms of each drive, the virtual upper limit value 602 corresponding to the drive is a value on the basis of the upper limit value complying with the hardware specifications of the drive, and the actual upper limit value 702 set for the CTL 6 of which the coupled drive is the relevant drive is a value obtained by dividing the value on the basis of the upper limit value complying with the hardware specifications of the relevant drive by the number of the CTLs 6 of which the coupled drives are each the relevant drive. As described above, the actual upper limit value 702 suitable for the CTL 6 and the virtual upper limit value 602 suitable for the entire distributed storage system 100 can be set for each CTL 6.

At least one of a plurality of CTLs 6 in a plurality of nodes 10 has a non-coupled drive which is a drive not physically coupled to that CTL 6. In a case where the receiving CTL 6 receiving the target Drive-IO is different from the executing CTL 6 of which the coupled drive is the issue destination drive, the target Drive-IO is acquired by the receiving CTL 6 from the virtual queue group 211 corresponding to the issue destination drive among a plurality of virtual queue groups 211 in the receiving CTL 6, transferred from the receiving CTL 6 to the executing CTL 6, and accumulated by the executing CTL 6 in the actual queue group 212 corresponding to the issue destination drive among a plurality of actual queue groups 212 in the executing CTL 6. In a case where the actual queue group 212 corresponding to the issue destination drive is filled up in the executing CTL 6, if the executing CTL 6 returns a predetermined response (e.g., a response requesting a retry) to the receiving CTL 6, and the receiving CTL 6 receives the predetermined response, the receiving CTL 6 may transfer again the target Drive-IO to the executing CTL 6.

In a case where the executing CTL 6 receives the target Drive-IO from the receiving CTL 6, the executing CTL 6 reduces the virtual upper limit value corresponding to the issue destination drive among a plurality of virtual upper limit values in the executing CTL 6. This can reduce the probability that the Drive-IO cannot be accumulated in the actual queue group 212 from the virtual queue group 211 in the executing CTL 6.

Each CTL 6 includes a plurality of processor cores. Each CTL 6 includes the virtual queue and the actual queue for each processor core in the CTL 6. In the executing CTL 6, the default value of the virtual upper limit value 602 corresponding to the issue destination drive is the value on the basis of the upper limit value complying with the hardware specifications of the issue destination drive. In a case where the receiving CTL 6 is different from the executing CTL 6, the virtual upper limit value 602 corresponding to the issue destination drive in the executing CTL 6 is reduced to a value the same as the number of processor cores included in the executing CTL 6.

The executing CTL 6 periodically returns the virtual upper limit value different from the default value, if any, to the default value in the executing CTL 6.

Each of a plurality of nodes 10 includes two or more CTLs 6. For example, a plurality of nodes 10 include a plurality of node groups. Each of a plurality of node groups is the redundant node 10. In each node 10, two or more CTLs 6 are the redundant CTLs 6.

Each CTL 6 dynamically adjusts each of a plurality of virtual upper limit values set for the CTL 6. For example, each CTL 6 adjusts each of a plurality of virtual upper limit values 602 set for the CTL 6 depending on an execution condition of the Drive-IO for the drive corresponding to the virtual upper limit value 602.

Each CTL 6 periodically adjusts each of a plurality of virtual upper limit values 602 set for the CTL 6. For example, each CTL 6 periodically returns the virtual upper limit value different from the default value, if any, to the default value in the CTL 6.

Hereinabove, an embodiment is described, but this is exemplified for describing the present invention, and not intended to limit a scope of the present invention only to the embodiment. The present invention can be carried out in other various modes.

What is claimed is:

1. A distributed storage system providing logical volumes to a host system, comprising:
   a plurality of storage nodes associated with a plurality of drives, wherein
   each of the plurality of storage nodes includes one or more controllers,
   each controller has a coupled drive which is a drive physically coupled to the controller in the plurality of drives,
   in a case where the each controller receives a Host-IO from the host system or another controller, the Host-IO being transmitted from the host system and being an I/O (Input/Output) command specifying an address of a logical volume, the each controller issues a Drive-IO on the basis of the received Host-IO, the Drive-IO being an I/O command specifying an address of a drive,
   the each controller includes an actual queue group containing one or more actual queues for each coupled drive of the controller, and a virtual queue group containing one or more virtual queues for each of the plurality of drives,
   each actual queue is a queue in which the Drive-IO transmitted to the drive is accumulated,
   each virtual queue is a queue in which the received Drive-IO is accumulated, and
   a target Drive-IO which is the Drive-IO received by any controller is accumulated in the actual queue group corresponding to an issue destination drive of the target Drive-IO after accumulated in the virtual queue group corresponding to the issue destination drive.

2. The distributed storage system according to claim 1, wherein
   in the each controller, a virtual upper limit value for each drive and an actual upper limit value for each coupled drive of the controller are set, the virtual upper limit value being an upper limit of the number Drive-IOs accumulable in the virtual queue group corresponding to the drive, the actual upper limit value being an upper limit of the number of Drive-IOs accumulable in the actual queue group corresponding to the coupled drive.

3. The distributed storage system according to claim 2, wherein
   in the each controller, in terms of each drive, the virtual upper limit value corresponding to that drive is the same as or larger than the actual upper limit value set for the controller of which the coupled drive is that drive.

4. The distributed storage system according to claim 3, wherein
   in the each controller, in terms of each drive,
      the virtual upper limit value corresponding to the drive is a value on the basis of an upper limit value complying with hardware specifications of that drive, and
      the actual upper limit value set for the controller of which the coupled drive is that drive is a value obtained by dividing the value on the basis of the upper limit value complying with the hardware specifications of that drive by the number of the controllers of which the coupled drives are each that drive.

5. The distributed storage system according to claim 3, wherein
   at least one of the plurality of controllers in the plurality of storage nodes has a non-coupled drive which is a drive not physically coupled to the controller,
   in a case where a receiving controller receiving the target Drive-IO is different from an executing controller of which the coupled drive is the issue destination drive, the target Drive-IO is
      acquired by the receiving controller from the virtual queue group corresponding to the issue destination drive among a plurality of virtual queue groups in the receiving controller,
      transferred from the receiving controller to the executing controller, and
      accumulated by the executing controller in the actual queue group corresponding to the issue destination drive among a plurality of actual queue groups in the executing controller.

6. The distributed storage system according to claim 5, wherein
   in a case where the executing controller receives the target Drive-IO from the receiving controller, the executing controller reduces the virtual upper limit value corresponding to the issue destination drive among a plurality of virtual upper limit values in the executing controller.

7. The distributed storage system according to claim 6, wherein
   the each controller includes a plurality of processor cores,
   the each controller includes the virtual queue and the actual queue for each processor core in the controller,
   in the executing controller, a default value of the virtual upper limit value corresponding to the issue destination drive is a value on the basis of an upper limit value complying with hardware specifications of the issue destination drive, and
   in a case where the receiving controller is different from the executing controller, the virtual upper limit value corresponding to the issue destination drive in the executing controller is reduced to a value the same as the number of processor cores included in the executing controller.

8. The distributed storage system according to claim 6, wherein
   the executing controller periodically returns the virtual upper limit value different from the default value, if any, to the default value in the executing controller.

9. The distributed storage system according to claim 1, wherein
   each of the plurality of storage nodes includes two or more controllers.

10. The distributed storage system according to claim 8, wherein
   the plurality of storage nodes include a plurality of node groups,
   each of the plurality of node groups is a redundant storage node, and
   in each storage node, two or more controllers are redundant controllers.

11. The distributed storage system according to claim 2, wherein
   the each controller dynamically adjusts each of a plurality of virtual upper limit values set for the controller.

12. The distributed storage system according to claim 11, wherein
   the each controller adjusts each of a plurality of virtual upper limit values set for the controller depending on an execution condition of the Drive-IO for the drive corresponding to the virtual upper limit value.

13. The distributed storage system according to claim 1, wherein
   the each controller periodically adjusts each of a plurality of virtual upper limit values set for the controller.

14. The distributed storage system according to claim 13 wherein
   the each controller periodically returns the virtual upper limit value different from a default value, if any, to the default value in the controller.

15. A storage controlling method implemented in a distributed storage system providing logical volumes to a host system,
   the distributed storage system including a plurality of storage nodes associated with a plurality of drives, wherein
   each of the plurality of storage nodes includes one or more controllers,
   each controller has a coupled drive which is a drive physically coupled to the controller in the plurality of drives,
   in a case where the each controller receives a Host-IO from the host system or another controller, the Host-IO being transmitted from the host system and being an I/O (Input/Output) command specifying an address of a logical volume, the each controller issues a Drive-IO on the basis of the received Host-IO, the Drive-IO being an I/O command specifying an address of a drive,
   the storage controlling method, comprising:
   setting, for the each controller, an actual queue group containing one or more actual queues for each coupled drive of the controller, and a virtual queue group containing one or more virtual queues for each of the plurality of drives, each actual queue being a queue in which the Drive-IO transmitted to the drive is accumulated, each virtual queue being a queue in which the received Drive-IO is accumulated, and
   accumulating a target Drive-IO which is the Drive-IO issued by any controller in the actual queue group corresponding to an issue destination drive of the target Drive-IO after accumulating in the virtual queue group corresponding to the issue destination drive by the controller receiving the target Drive-IO.

* * * * *